A. A. MURPHY & C. C. HEARLE.
Fire-Extinguisher.
No. 163,328. Patented May 18, 1875.
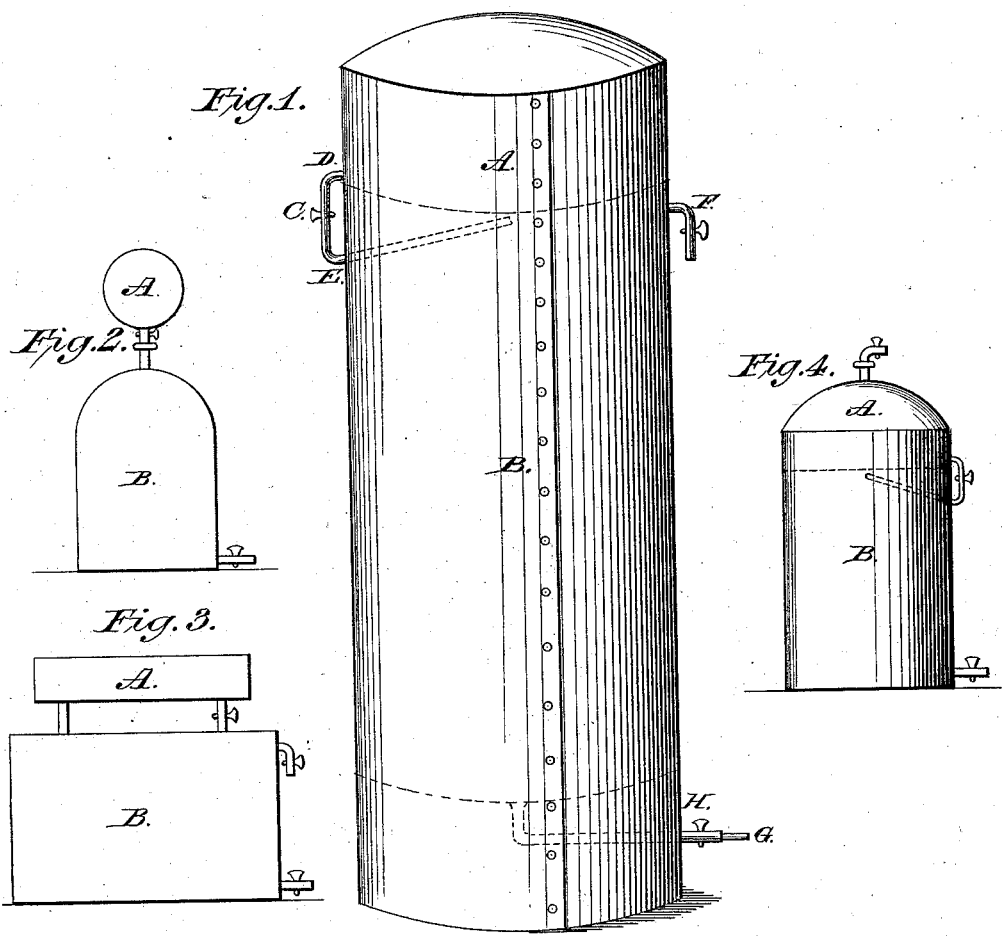
Attest:
Donald Young
Henry James Raymore
Inventors.
Alexander Allen Murphy
Charles Coffin Hearle

UNITED STATES PATENT OFFICE.

ALEXANDER ALLEN MURPHY AND CHARLES COPPIN HEARLE, OF MONTREAL, CANADA.

IMPROVEMENT IN FIRE-EXTINGUISHERS.

Specification forming part of Letters Patent No. 163,328, dated May 18, 1875; application filed March 11, 1875.

*To all whom it may concern:*

Be it known that we, ALEXANDER ALLEN MURPHY, of the city of Montreal, Province of Quebec, Dominion of Canada, merchant, and CHARLES COPPIN HEARLE, of the same place, merchant, have jointly invented certain new and useful Improvements in Fire-Extinguishers, which may also be used for gardening purposes, washing windows, &c.; and we do hereby declare the following to be a full, clear and exact description of the same.

Our invention consists of two or more compartments or reservoirs, as represented in the annexed drawing, as at A and B, Figure 1, and so connected by means of a pipe, D E, that when water is forced into B through the pipe G by means of a force-pump, or by attaching the same to the city water-pipes, a quantity of air is compressed into the chamber A, which, when full, is tightly closed by means of a valve, C, placed in the connecting-pipe D E, after which an air-cock, F, placed in the upper portion of the chamber or reservoir B, is opened, and the pipe G is then opened by means of a valve, H, and the water in the reservoir B is allowed to pass off, after which the air-cock F is closed and water is again forced through the pipe G into the reservoir B, and a quantity of air is compressed into the upper portion of the reservoir or compartment B, the lower portion being filled with water. The valve H is then closed, and the valve C is then opened, when the apparatus is ready for use.

The compressed-air contained in the upper portion of the compartment or reservoir B would not be sufficient to throw the water, when low, from the same through the pipe G, but by opening the valve C on the connecting-pipe D E the compressed air contained in the chamber A is allowed to pass into the reservoir B, which, together with the compressed air therein contained, forces the water in the same out through the pipe G with great force.

When the apparatus is fully charged, a hose or tubing, with proper nozzle, may be applied to the opening of the pipe G, and the apparatus may be used either as a fire-extinguisher or for gardening purposes, washing windows, &c.

Fig. 2 represents the reservoir, so arranged that the one used for containing the compressed air A may be disconnected from the connecting-pipe, after the same has been filled with compressed air. Others may be filled with air as in the manner heretofore described, and applied when needed, thereby saving much time in case of an emergency, by applying them, one after another, making it only necessary to fill the water-reservoir B at the time of using the apparatus.

We propose to manufacture these of metal, and of sufficient strength to resist any ordinary pressure, and also of different sizes and shapes.

Fig. 3 in the annexed drawing represents the shape in which we propose to make the apparatus for portable purposes, to go on wheels, one of the two supports being the connecting-pipe between the reservoirs. Fig. 4 represents the apparatus so constructed as to allow the air-reservoir A to be filled with compressed air by means of an air force-pump.

We make no claim to the principle, for we are aware that it has long been known; but

We claim as our invention—

The air-compressing chamber B, in combination with the chamber or reservoir A, and pipe D E, provided with a valve, substantially as and for the purpose set forth.

Montreal, March 5, 1875.

ALEXANDER ALLEN MURPHY.
CHARLES COPPIN HEARLE.

Witnesses:
DONALD YOUNG,
HENRY JAMES RAYMORE.